United States Patent
Hirano et al.

(10) Patent No.: US 12,410,363 B2
(45) Date of Patent: Sep. 9, 2025

(54) DIVERTING AGENT AND METHOD OF FILLING FRACTURE IN WELL USING SAME

(71) Applicant: Mitsubishi Chemical Corporation, Tokyo (JP)

(72) Inventors: Yasuhiro Hirano, Tokyo (JP); Ryosuke Taniguchi, Tokyo (JP); Chizuko Furo, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/397,262

(22) Filed: Aug. 9, 2021

(65) Prior Publication Data

US 2021/0363412 A1  Nov. 25, 2021

Related U.S. Application Data

(63) Continuation of application No. PCT/JP2020/005303, filed on Feb. 12, 2020.

(30) Foreign Application Priority Data

Feb. 13, 2019  (JP) ................. 2019-023948

(51) Int. Cl.
  *C09K 8/68* (2006.01)
  *C09K 8/70* (2006.01)

(52) U.S. Cl.
  CPC . *C09K 8/68* (2013.01); *C09K 8/70* (2013.01)

(58) Field of Classification Search
  CPC . C09K 8/508; C09K 8/68; C09K 8/70; C09K 8/516; E21B 43/26; E21B 43/261; E21B 43/267; E21B 43/16; E21B 33/13
  See application file for complete search history.

(56) References Cited

U.S. PATENT DOCUMENTS

| | | | |
|---|---|---|---|
| 11,384,274 B2* | 7/2022 | Fujita | C08L 29/04 |
| 2006/0157248 A1* | 7/2006 | Hoefer | C09K 8/68 |
| | | | 166/302 |
| 2016/0137906 A1 | 5/2016 | Guan et al. | |
| 2016/0298017 A1 | 10/2016 | Takahashi et al. | |
| 2017/0210965 A1 | 7/2017 | Cortez et al. | |
| 2017/0253703 A1 | 9/2017 | Yoshikawa et al. | |
| 2018/0010037 A1 | 1/2018 | Yoshikawa et al. | |
| 2019/0153290 A1* | 5/2019 | Katou | C09K 8/512 |
| 2020/0172796 A1 | 6/2020 | Tsuji et al. | |
| 2021/0309909 A1 | 10/2021 | Hirano et al. | |
| 2023/0147740 A1 | 5/2023 | Tsuji et al. | |

FOREIGN PATENT DOCUMENTS

| | | | | |
|---|---|---|---|---|
| CA | 2593607 C | * | 1/2012 | ............. C08B 31/00 |
| CA | 2937762 C | * | 8/2018 | ............. C09K 8/035 |
| CN | 101602826 A | | 12/2009 | |
| CN | 107286916 A | | 10/2017 | |
| CN | 107629774 A | | 1/2018 | |
| CN | 110997861 A | | 4/2020 | |
| CN | 113195553 A | | 7/2021 | |
| EP | 3666849 | | 6/2020 | |
| EP | 3904396 | | 11/2021 | |
| EP | 3904401 | | 11/2021 | |
| JP | 2004-285143 A | | 10/2004 | |
| JP | 2016-056272 A | | 4/2016 | |
| JP | 2016-147971 A | | 8/2016 | |
| JP | 2016-147972 A | | 8/2016 | |
| WO | WO-2012103474 A2 | * | 8/2012 | ........... E21B 33/138 |
| WO | 2015/072317 A1 | | 5/2015 | |

OTHER PUBLICATIONS

Translation of CN 102015959A. (Year: 2011).*
English translation of WO 2015/099131. (Year: 2015).*
European Search Report issued with respect to European Application No. 20755812.3, dated Mar. 7, 2022.
ISR issued in WIPO Patent Application No. PCT/JP2020/005303, May 12, 2020, English translation.
Written Opinion issued in WIPO Patent Application No. PCT/JP2020/005303, May 12, 2020, English translation.
IPRP issued in WIPO Patent Application No. PCT/JP2020/005303, Aug. 10, 2021, English translation.
Office Action issued in Japanese Patent Application No. 2020-572267, issued Mar. 5, 2024, translation.
Office Action issued in CN Patent Application No. 202080013459.9 Sep. 28, 2023, translation.
Office Action issued in EP Patent Application No. 20755812.3, Jun. 28, 2024.
Office Action issued in EP Patent Application No. 20755812.3, Mar. 28, 2025.
"®Mowiol Polyvinyl Alcohol", Dec. 1, 1999, pp. 1-105, Retrieved from the Internet:URL:https://ia903101.us.archive.org/35/items/polyvinylalcoholmanufacturemanual/Mowiol%20manual.pdf.

* cited by examiner

*Primary Examiner* — Zakiya W Bates
(74) *Attorney, Agent, or Firm* — GREENBLUM & BERNSTEIN P.L.C.

(57) ABSTRACT

A diverting agent is provided which does not completely dissolve in water and seawater in an ultra-low temperature to low temperature range (5° C. to 30° C.) for a certain period of time (about 5 minutes to 3 hours), and is quickly dissolved and removed after a certain period of time in an excavation method using a hydraulic fracturing method. Also provided is a diverting agent containing a polyvinyl alcohol-based resin having 2.3 mol % to 15 mol % of a hydrophilic modifying group in a molecular structure thereof.

9 Claims, No Drawings

DIVERTING AGENT AND METHOD OF FILLING FRACTURE IN WELL USING SAME

CLAIM FOR PRIORITY

This application is a Continuation of PCT/JP2020/005303 filed Feb. 12, 2020, and claims the priority benefit of Japanese application 2019-023948 filed Feb. 13, 2019, the contents of which are expressly incorporated by reference herein in their entireties.

TECHNICAL FIELD

The present invention relates to a diverting agent and a method of filling a fracture in a well using the diverting agent. More specifically, the present invention relates to a diverting agent to be used during construction of an excavation method using a hydraulic fracturing method, and a method of filling a fracture in a well using the diverting agent.

BACKGROUND ART

For collecting petroleum or other underground resources, a hydraulic fracturing method in which high-pressure water is injected into an underground shale layer to cause fractures is widely adopted. In the hydraulic fracturing method, at first, a vertical hole (vertical well) with a depth of several thousand of meters is excavated vertically by a drill, and then, when the vertical hole reaches the shale layer, a horizontal hole (horizontal well) with a diameter of ten to several tens of centimeters is excavated horizontally. By filling the vertical well and the horizontal well with a fluid and pressurizing the fluid, fractures are generated from the well. Natural gas, petroleum (shale gas/oil), or the like in the shale layer flows out from the fractures, and is then collected. According to such a method, a resource inflow cross-section of the well can be increased by generation of fractures and underground resources can be efficiently collected.

In the hydraulic fracturing method described above, prior to generation of fractures by fluid pressurization, preliminary blasting called perforation is performed in the horizontal well. By such preliminary blasting, borings are made from the well to a production layer. After that, by injecting a fracturing fluid into the well, the fluid flows into these borings, and a load is applied to the borings. Then, fractures are generated in these borings and grow into fractures in a size suitable for resource collection.

In the hydraulic fracturing method, a part of fractures that have already been generated are temporarily filled with an additive called a diverting agent in order to grow fractures that have already been generated larger or to generate more fractures. By temporarily filling a part of the fractures with the diverting agent and pressurizing the fracturing fluid filled in the well in this state, the fluid may enter other fractures, so that other fractures can grow larger or new fractures can be generated.

Since the diverting agent is used to temporarily fill the fractures as described above, a diverting agent which can maintain the shape for a certain period of time and disappears by hydrolysis when natural gas, petroleum, or the like is collected is used. For example, various techniques in which a hydrolyzable resin such as polyglycolic acid or polylactic acid is used as a diverting agent have been proposed.

PTL 1 has proposed a temporary sealing agent for use in well boring, which contains polyglycolic acid having high biodegradability among biodegradable aliphatic polyester-based resins.

In addition, PTL 2 has proposed a powder containing particles of polylactic acid which is a biodegradable resin, and in the powder, 50 mass % or more of particles do not pass through a sieve having an opening of 500 μm and the particles have an angle of repose of 51 degrees or more.

Further, PTL 3 has proposed hydrolyzable particles having a dispersion structure in which fine particles of a polyoxalate having a high biodegradability for adjusting the hydrolysis performance of polylactic acid are distributed in the polylactic acid, and having an average particle diameter ($D_{50}$) in a range of 300 μm to 1,000 urn and a roundness, that is, a minor axis/major axis ratio, of 0.8 or more.

Furthermore, PTL 4 has proposed polyoxalate particles having an average particle diameter ($D_{50}$) in a range of 300 μm to 1,000 μm and a roundness, that is, a minor axis/major axis ratio, of 0.8 or more.

CITATION LIST

Patent Literature

PTL 1: WO 2015/072317
PTL 2: JP-A-2016-56272
PTL 3: JP-A-2016-147971
PTL 4: JP-A-2016-147972

SUMMARY OF INVENTION

Technical Problem

In the hydraulic fracturing method, it is necessary to fill the fractures that have already been generated without gaps in order to grow the fractures or generate new fractures. However, a conventional diverting agent uses a water-insoluble resin such as polyglycolic acid or polylactic acid, and there is a problem that it takes a time for removal.

In recent years, resources have been collected by a hydraulic fracturing method on the seabed of the North Sea and the like. At this time, depending on where the resources are collected, there are places where the temperature can be an ultra-low temperature to low temperature, 5° C. to 30° C., and it takes more time for a conventional diverting agent to be removed from the seawater in an ultra-low temperature to low temperature range as described above.

Therefore, the present invention has been made to solve the above problems, and an object thereof is to provide a diverting agent which does not completely dissolve in water and seawater in an ultra-low temperature to low temperature range (5° C. to 30° C.) for a certain period of time (about 5 minutes to 3 hours), and is quickly dissolved and removed after a certain period of time in an excavation method using a hydraulic fracturing method.

Solution to Problem

As a result of intensive studies, the present inventors have found that when the diverting agent contains a polyvinyl alcohol-based resin having a specific amount of a hydrophilic modifying group, the above problems can be solved.

That is, the present invention relates to the following <1> to <6>.

<1> A diverting agent containing:
a polyvinyl alcohol-based resin having 2.3 mol % to 15 mol % of a hydrophilic modifying group in a molecular structure thereof.

<2> The diverting agent according to <1>, wherein the polyvinyl alcohol-based resin has 2.3 mol % to 6 mol % of the hydrophilic modifying group and is in the form of a powder.

<3> The diverting agent according to <1>, wherein the polyvinyl alcohol-based resin has 2.5 mol % to 15 mol % of the hydrophilic modifying group and is in the form of a melt molded body.

<4> The diverting agent according to any one of <1> to <3>, wherein the polyvinyl alcohol-based resin is a polyvinyl alcohol-based resin having a primary hydroxy group in a side chain thereof.

<5> The diverting agent according to any one of <1> to <4>, which is used in an aqueous solution of 30° C. or lower.

<6> A method of temporarily filling a fracture generated in a well, the method including:
allowing the diverting agent according to any one of <1> to <5> to flow into a fracture with a flow of a fluid in the well.

Advantageous Effects of Invention

The diverting agent of the present invention does not completely dissolve in water and seawater in an ultra-low temperature to low temperature range (5° C. to 30° C.) for a certain period of time (about 5 minutes to 3 hours), and is quickly dissolved and removed after a certain period of time in an excavation method using a hydraulic fracturing method.

DESCRIPTION OF EMBODIMENTS

Hereinafter, the present invention will be described in detail, but these show examples of desirable embodiments, and the present invention is not specified in these contents.

The term "polyvinyl alcohol" is sometimes simply referred to as "PVA".

In addition, the term (meth)allyl means allyl or methallyl, (meth)acryl means acryl or methacryl, and (meth)acrylate means acrylate or methacrylate.

Further, the term "water" means fresh water.

[PVA-Based Resin]

A PVA-based resin contained in a diverting agent of the present invention has 2.3 mol % to 15 mol % of a hydrophilic modifying group in a molecular structure thereof.

When the content of the hydrophilic modifying group in the PVA-based resin is 2.3 mol % or more, the hydrophilic modifying group increases the affinity of the PVA-based resin with water, and even in an ultra-low temperature to low temperature range, the PVA-based resin dissolves in water after a certain period of time. It is considered that the increased affinity of the PVA-based resin with water makes it hard to be salted out by salts in seawater and increases the solubility in seawater.

When the content of the hydrophilic modifying group in the PVA-based resin is 15 mol % or less, the filling property is considered to be improved.

From the viewpoint of solubility in water and seawater, the content of the hydrophilic modifying group in the PVA-based resin is preferably 2.4 mol % to 15 mol %, more preferably 2.5 mol % to 13 mol %, and still more preferably 2.7 mol % to 10 mol %.

The content (modification rate) of the hydrophilic modifying group can be determined from a $^1$H-NMR spectrum (solvent: DMSO-$d_6$ or $D_2O$) of a PVA-based resin having a degree of saponification of 100 mol %.

Examples of setting the modification rate within the above range include a method of adjusting the amount of a vinyl ester-based monomer described later.

The degree of saponification (measured according to JIS K 6726:1994) of the PVA-based resin for use in the present invention is generally 60 mol % to 100 mol %. When the degree of saponification is too low, the solubility in water and seawater tends to decrease. From the viewpoint of the filling property against gaps such as fractures, the degree of saponification is preferably 90 mol % or more, and more preferably 95 mol % or more. The upper limit of the degree of saponification is preferably 99.8 mol % or less, and more preferably 99.6 mol % or less.

The average polymerization degree (measured according to JIS K 6726:1994) of the PVA-based resin for use in the present invention is preferably 100 to 3,500, more preferably 150 to 3000, still more preferably 200 to 2,500, and particularly preferably 300 to 2,000. When the average polymerization degree is too small, the solubility of the PVA-based resin in water and seawater tends to decrease. When the average polymerization degree is too large, the production of the PVA-based resin tends to be difficult.

The viscosity of a 4 mass % aqueous solution of the PVA-based resin for use in the present invention is preferably 2.0 mPa·s to 85 mPa·s, more preferably 2.5 mPa·s to 80 mPa·s, still more preferably 3.0 mPa·s to 75 mPa·s, and particularly preferably 3.5 mPa·s to 70 mPa·s. When the viscosity of the 4 mass % aqueous solution is too low, the effects of the present invention tend to be difficult to obtain. When the viscosity of the 4 mass % aqueous solution is too high, the production of the PVA-based resin tends to be difficult.

The viscosity of the 4 mass % aqueous solution is a viscosity at 20° C. measured in accordance with JIS K 6726:1994, by preparing a 4 mass % aqueous solution of the PVA-based resin.

The PVA-based resin for use in the present invention is a resin containing, as a main structural unit, a vinyl alcohol structural unit obtained by saponification of a polyvinyl ester-based resin obtained by polymerization of a vinyl ester-based monomer, and has a vinyl alcohol structural unit corresponding to the degree of saponification and a vinyl acetate structural unit of an unsaponified moiety.

As described above, the PVA-based resin for use in the present invention has a hydrophilic modifying group, and is obtained by appropriately introducing a hydrophilic modifying group into the main chain or the side chain of an unmodified PVA.

The hydrophilic modifying group of the present invention does not include the above vinyl acetate structural unit of the unsaponified moiety, and examples thereof include a modifying group such as a hydroxy group, a sulfonic acid group, a carboxyl group, an amino group, a phosphoric acid group, an amide group, and a thiol group.

From the viewpoint of solubility in water and seawater, the PVA-based resin having a hydrophilic modifying group is preferably a PVA-based resin having a primary hydroxy group in the side chain, a sulfonic acid-modified PVA-based resin, and a carboxylic acid-modified PVA-based resin.

Among these, a PVA-based resin having a primary hydroxy group in the side chain is particularly preferred in terms of being excellent in melt moldability. The number of the primary hydroxy group in the PVA-based resin having a primary hydroxy group in the side chain is generally 1 to 5, preferably 1 to 2, and particularly preferably 1.

Examples of the PVA-based resin having a primary hydroxy group in the side chain include a modified PVA-based resin having a 1,2-diol structural unit in the side chain and a modified PVA-based resin having a hydroxyalkyl group structural unit in the side chain. Among these, it is particularly preferable to use a modified PVA-based resin having a 1,2-diol structural unit in the side chain (hereinafter, may be referred to as "modified PVA-based resin having a side-chain 1,2-diol structural unit") represented by the following general formula (1).

The moiety other than the 1,2-diol structural unit is a vinyl alcohol structural unit and a vinyl ester structural unit in an unsaponified moiety, similar to a general PVA-based resin.

[Chem. 1]

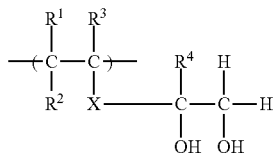

(1)

(In the general formula (1), $R^1$ to $R^4$ each independently represent a hydrogen atom or an alkyl group having 1 to 4 carbon atoms, and X represents a single bond or a bond chain.)

In the above general formula (1), $R^1$ to $R^4$ each independently represent a hydrogen atom or an alkyl group having 1 to 4 carbon atoms. $R^1$ to $R^4$ are preferably all hydrogen atoms, however may be an alkyl group having 1 to 4 carbon atoms as long as the resin properties are not remarkably impaired. The alkyl group is not particularly limited, and is preferably, for example, a methyl group, an ethyl group, an n-propyl group, an isopropyl group, an n-butyl group, an isobutyl group, and a tert-butyl group. The alkyl group may have a substituent such as a halogen group, a hydroxy group, an ester group, a carboxylic acid group, or a sulfonic acid group as needed.

In the above general formula (1), X is a single bond or a bond chain, preferably a single bond in terms of thermal stability and stability under high temperature and acidic conditions, but may be a bond chain as long as the effect of the present invention is not impaired.

Such a bond chain is not particularly limited, and examples thereof include hydrocarbon groups such as an alkylene group, an alkenylene group, an alkynylene group, a phenylene group, and a naphthylene group (these hydrocarbon groups may be substituted with a halogen atom such as a fluorine atom, a chlorine atom or a bromine atom), —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—.

Each R is independently a hydrogen atom or an optional substituent, and is preferably a hydrogen atom or an alkyl group (particularly an alkyl group having 1 to 4 carbon atoms). In addition, m is a natural number, and is preferably 1 to 10, particularly preferably 1 to 5. Among these, the bond chain is preferably an alkylene group having 6 or less carbon atoms, particularly a methylene group, or —CH$_2$OCH$_2$— in terms of viscosity stability and heat resistance during production.

In a particularly preferred structure of the 1,2-diol structural unit represented by the general formula (1), $R^1$ to $R^4$ are all hydrogen atoms, and X is a single bond.

Examples of a method for producing the PVA-based resin used in the present invention include a method of polymerizing vinyl ester-based monomers and performing saponification of the obtained polyvinyl ester polymer.

Examples of the vinyl ester-based monomer include vinyl acetate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl piperate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate. From the viewpoint of price and availability, vinyl acetate is preferably used.

Examples of the monomer for use in the copolymerization of the vinyl ester-based monomer in the production of a polyvinyl ester polymer include: olefins such as ethylene, propylene, isobutylene, α-octene, α-dodecene, and α-octadecene; unsaturated acids such as an acrylic acid, a methacrylic acid, a crotonic acid, a maleic acid, a maleic anhydride, and an itaconic acid, or a salt thereof, a mono-, di-alkyl ester thereof or the like; nitriles such as acrylonitrile and methacrylonitrile; amides such as acrylamide and methacrylamide; olefin sulfonic acids such as an ethylene sulfonic acid, an allyl sulfonic acid, and a methallyl sulfonic acid or a salt thereof; alkyl vinyl ethers; N-acrylamidomethyltrimethylammonium chloride; allyltrimethylammonium chloride; dimethylallyl vinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene[1-(meth)acrylamide-1,1-dimethylpropyl] ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxy group-containing α-olefins such as 3-buten-1-ol, 4-penten-1-ol, and 5-hexen-1-ol, or derivatives such as an acylated product thereof.

In addition, examples thereof include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diasiloxy-1-pentene, 4,5-dihydroxy-3-methyl-1-pentene, 4,5-diasiloxy-3-methyl-1-pentene, 5,6-dihydroxy-1-hexene, 5,6-diasiloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

The polymerization of the vinyl ester-based monomers or the polymerization of the vinyl ester-based monomer and a copolymerizable monomer can be performed by any known polymerization method such as solution polymerization, suspension polymerization, and emulsion polymerization.

Among these, it is preferable to perform the solution polymerization which can remove reaction heat efficiently under reflux.

Examples of a solvent for use in the polymerization include aliphatic alcohols having 1 to 4 carbon atoms such as methanol, ethanol, isopropyl alcohol, n-propanol, and butanol, or ketones such as acetone and methyl ethyl ketone. A lower alcohol having 1 to 3 carbon atoms is preferably used.

For the saponification of the obtained polymer, a conventional known saponification method can be employed. That is, the saponification can be performed using an alkali catalyst or an acid catalyst in a state where the polymer is dissolved in an alcohol or a water/alcohol solvent.

As the alkali catalyst, for example, alkali metal hydroxides such as potassium hydroxide, sodium hydroxide, sodium methylate, sodium ethylate, potassium methylate, and lithium methylate, or alcoholate can be used.

Generally, saponification is preferably performed by a transesterification reaction using an alkali catalyst in the presence of an anhydrous alcohol solvent in terms of reaction rate or reduction of impurities such as fatty acid salts.

The reaction temperature of the saponification reaction is generally 20° C. to 60° C. When the reaction temperature is too low, the reaction rate tends to decrease and the reaction efficiency tends to decrease; when the reaction temperature is too high, the reaction temperature may exceed the boiling point of the reaction solvent, and the safety in production tends to decrease. In a case of performing the saponification under a high pressure using a tower-type continuous saponification tower with high pressure resistance, the saponification can be performed at a higher temperature, for example, 80° C. to 150° C., and a PVA-based resin having a high degree of saponification can be obtained in a short time even using a small amount of saponification catalyst.

The modified PVA-based resin having a side-chain 1,2-diol structural unit can be produced by a known production method. For example, the above modified PVA-based resin can be produced by a method described in JP-A-2002-284818, JP-A-2004-285143, or JP-A-2006-95825. That is, the above modified PVA-based resin can be produced by (i) a method of saponifying a copolymer of a vinyl ester-based monomer and a compound represented by the following general formula (2), (ii) a method of saponifying and decarboxylating a copolymer of a vinyl ester-based monomer and a vinyl ethylene carbonate represented by the following general formula (3), (iii) a method of saponifying and deketalizing a copolymer of a vinyl ester-based monomer and a 2,2-dialkyl-4-vinyl-1,3-dioxolane represented by the following general formula (4), or the like.

[Chem. 2]

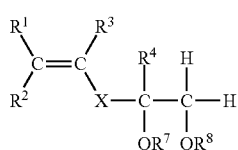

(2)

(In the general formula (2), $R^1$ to $R^4$ each independently represent a hydrogen atom or an alkyl group having 1 to 4 carbon atoms, X represents a single bond or a bond chain, and $R^7$ and $R^8$ each independently represent a hydrogen atom or $R^9$—CO— (wherein, $R^9$ is an alkyl group having 1 to 4 carbon atoms).)

[Chem. 3]

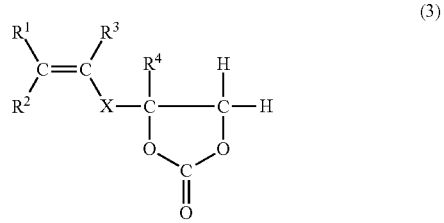

(3)

(In the general formula (3), $R^1$ to $R^4$ each independently represent a hydrogen atom or an alkyl group having 1 to 4 carbon atoms, and X represents a single bond or a bond chain.)

[Chem. 4]

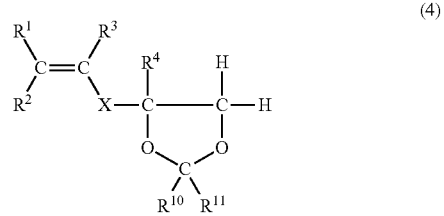

(4)

(In the general formula (4), $R^1$ to $R^4$ each independently represent a hydrogen atom or an alkyl group having 1 to 4 carbon atoms, X represents a single bond or a bond chain, and $R^{10}$ and $R^{11}$ each independently represent a hydrogen atom or an alkyl group having 1 to 4 carbon atoms.)

Specific examples and preferred examples of $R^1$ to $R^4$ and X in the general formulas (2) to (4) are the same as those in the above general formula (1), and specific examples and preferred examples of the alkyl group having 1 to 4 carbon atoms of $R^7$ to $R^{11}$ are also the same as those of the general formula (1).

Among the above methods, the method (i) is preferred in that copolymerization reactivity and industrial handling are excellent. In particular, as the compound represented by the general formula (2), it is preferable to use 3,4-diacyloxy-1-butene in which $R^1$ to $R^4$ are hydrogen atoms, X is a single bond, $R^7$ and $R^8$ are $R^9$—CO—, and $R^9$ is an alkyl group having 1 to 4 carbon atoms. Among these, 3,4-diacetoxy-1-butene in which $R^9$ is a methyl group is particularly preferably used.

The PVA-based resin for use in the present invention can be used, for example, in the form of a powder, a melt molded body, a flake, or the like. Among these, from the viewpoint of solubility in water and seawater, the PVA-based resin is preferably in the form of a powder or a melt molded body.

Here, a powdery PVA-based resin means a resin obtained by finally pulverization in the production process of the PVA-based resin.

When the PVA-based resin is in the form of a powder, the average particle diameter thereof is preferably 100 μm to 2000 μm, more preferably 200 μm to 1500 μm, and still more preferably 400 μm to 1300 μm. When the average particle diameter is too small, handling tends to be difficult due to scattering. When the average particle diameter is too large, the reaction tends to be non-uniform in the case of post-reaction and modification.

In the present description, the average particle diameter is a diameter at which the integrated value (cumulative distribution) is 50% when a particle diameter-based volume distribution is measured by a dry sieving test method (see JIS Z8815:1994).

When the PVA-based resin is in the form of a powder, the content of the hydrophilic modifying group is preferably 2.3 mol % to 6 mol %, more preferably 2.5 mol % to 5 mol %, and still more preferably 2.7 mol % to 4 mol %, from the viewpoint of solubility in water and seawater.

Further, the melt-molded body of the PVA-based resin means a product finally obtained by melt molding in the production process of the PVA-based resin. As a method of melt molding, a known method can be adopted, and examples thereof include an extrusion molding method, an injection molding method, and a blow molding method.

When the PVA-based resin is a melt-molded body, the shape of the particles of the PVA-based resin is preferably cylindrical (pellet), from the viewpoint of solubility in water and seawater. In this case, the particle diameter of the particles may be adjusted as appropriate in consideration of the size of fractures in the well. For example, the diameter of the cross section orthogonal to the axial direction is preferably 0.5 mm to 5.0 mm, more preferably 1.0 mm to 4.5 mm, and still more preferably 1.5 mm to 4.0 mm, and the thickness (length in the axial direction) is preferably 0.5 mm to 5.0 mm, more preferably 1.0 mm to 4.5 mm, and still more preferably 1.5 mm to 4.0 mm.

When the PVA-based resin is a melt-molded body, the content of the hydrophilic modifying group is preferably 2.5 mol % to 15 mol %, more preferably 2.8 mol % to 13 mol %, and still more preferably 3.0 mol % to 10 mol %, from the viewpoint of solubility in water and seawater.

The PVA-based resin for use in the present invention may be composed of one type of resin, or may be a mixture of two or more types of resins. In the case of using two or more types of PVA-based resins, for example, a combination of two or more unmodified PVA-based resins having different degrees of saponification, average polymerization degrees, or melting points; a combination of a PVA-based resin produced by melt molding and a PVA-based resin obtained without melt molding; or a combination of PVA-based resins having different shapes or particle diameters is used.

[Diverting Agent]

The diverting agent of the present invention contains the above PVA-based resin. The content of the PVA-based resin is preferably 50 mass % to 100 mass %, more preferably 80 mass % to 100 mass %, and still more preferably 90 mass % to 100 mass % with respect to the entire diverting agent. When the content is too small, the effects of the present invention tend to be difficult to obtain.

In addition to the PVA-based resin, additives such as sand, iron, ceramic, and other biodegradable resins can be blended in the diverting agent of the present invention.

The amount of the additive to be blended is preferably 50 mass % or less, more preferably 20 mass % or less, and still more preferably 10 mass % or less with respect to the entire diverting agent.

When petroleum, natural gas, or the like is excavated in a hydraulic fracturing method, the diverting agent of the present invention enters fractures or fissures formed in the well, and then temporarily fills the fractures or fissures, so that new fractures or fissures can be formed. As a method for filling the fractures or fissures, the diverting agent of the present invention is allowed to flow into the fractures with a flow of fluid in the well.

Further, the diverting agent of the present invention is water-soluble, can be used in water an ultra-low temperature to low temperature of 5° C. to 30° C., and is biodegradable. Therefore, the diverting agent of the present invention is very useful because of being rapidly dissolved and removed in water and seawater after use, and then biodegraded, and has a small environmental load.

EXAMPLES

The present invention will be specifically described by way of the following Examples, but the present invention is not limited thereto.

In Examples, "parts" and "%" mean mass basis unless otherwise specified.

Test Example 1

Example 1

Into a reaction can equipped with a reflux condenser, a dripping device, and a stirrer, 25 parts of vinyl acetate (25% of the total for initial charge), 18 parts of methanol and 1.5 parts of 3,4-diacetoxy-1-butene (25% of the total for initial charge) were charged, the temperature was raised under a nitrogen stream while stirring to reach the boiling point, and then 0.080 part of acetyl peroxide was added to start polymerization.

After 0.5 hour from the start of polymerization, 75 parts of vinyl acetate and 4.5 parts of 3,4-diacetoxy-1-butene were dropped at a constant speed over 1.5 hours. When the polymerization rate of vinyl acetate was 97%, a predetermined amount of hydroquinone monomethyl ether was added to complete the polymerization, and then distillation was performed while blowing methanol vapor to remove unreacted vinyl acetate monomer out of the system to obtain a methanol solution of a copolymer.

Then, the above solution was diluted with methanol and adjusted to have a solid content concentration of 52%. The solution temperature was maintained at 45° C., and a methanol solution of 2% sodium hydroxide (in terms of sodium) was added in an amount of 12 mmol with respect to 1 mol (total amount) of vinyl acetate structural units and 3,4-diacetoxy-1-butene structural units in the copolymer, thereby performing saponification. As the saponification proceeded, a saponified product was precipitated, and when the form of the precipitated saponified product was turned into a cake shape, the cake was moved to a belt and crushed thereon. Thereafter, acetic acid for neutralization was added in an amount of 0.3 equivalent per 1.0 equivalent of sodium hydroxide. The saponified product was filtered, well washed with methanol and dried in a hot air dryer, to obtain powdery modified PVA-based resin having a side-chain 1,2-diol structural unit (PVA-1).

[Evaluation of PVA-1]

(Degree of Saponification)

The degree of saponification of PVA-1 was determined by the amount of alkali consumed for hydrolysis of the residual vinyl acetate and 3,4-diacetoxy-1-butene structural units in the resin according to JIS K 6726:1994. The results are shown in Table 1.

(Average Polymerization Degree)

The average polymerization degree of PVA-1 was analyzed according to JIS K 6726:1994. The results are shown in Table 1.

(Modification Rate)

In PVA-1, the content (modification rate) of the 1,2-diol structural unit represented by the above formula (1) was calculated based on an integrated value determined by $^1$H-NMR (300 MHz proton NMR, a DMSO-$d_6$ solution, internal standard substance: tetramethylsilane, 50° C.). The results are shown in Table 1.

(Average Particle Diameter)

The average particle diameter of PVA-1 was calculated as a particle diameter at which the integrated value was 50% by using a dry sieving test method (see JIS Z 8815:1994). The results are shown in Table 1.

(Dissolution Rate after 30 Minutes)

Two 140 mL glass containers with lids were prepared, one containing 100 g of water and the other containing 100 g of seawater. The two glass containers were placed in a thermostat and the water temperature was set to 5° C. The long sides of 120 mesh (aperture: 125 μm, 10 cm×7 cm) made of nylon were folded in half, and both ends were heat-sealed to obtain a bag-like mesh (5 cm×7 cm).

1 g of PVA-1 was put into the obtained bag-like mesh, the opening was heat-sealed to obtain a bag-like mesh containing PVA-1, and then the mass was measured. The bag-like mesh containing PVA-1 was immersed in the two glass containers. After standing for 30 minutes in the thermostatic chamber at 5° C., the bag-like mesh containing PVA-1 was taken out of the two glass containers and dried at 140° C. for 3 hours, and the mass of the bag-like mesh containing PVA-1 was measured. The mass of PVA-1 remaining in the bag-like mesh was calculated based on the mass before immersion, and the dissolution rate of PVA-1 in water and seawater after 30 minutes was calculated according to the following equation. The results are shown in Table 1.

In the following equation, the solid fraction (mass %) of the PVA-based resin can be calculated by drying the PVA-based resin at 140° C. for 3 hours and measuring the mass of the PVA-based resin before and after drying.

$$\text{DISSOLUTION RATE AFTER 30 MINUTES(MASS \%)} = \left\{ 1(g) - \frac{\text{MASS(g) OF } PVA\text{-BASED RESIN REMAINING IN BAG-LIKE MESH} \times \frac{1}{\text{SOLID FRACTION(MASS \%)}}}{1(g) \times \frac{\text{OF } PVA\text{-BASED RESIN}}{100}} \right\} \times 100 \quad [\text{Math. 1}]$$

(Dissolution Rate after 24 Hours)

The dissolution rate of PVA-1 in water and seawater after 24 hours was calculated in the same manner as above (Dissolution Rate after 30 Minutes), except that the water temperature was set to 20° C. and the standing time in the thermostat was set to 24 hours. The results are shown in Table 1.

Example 2

A powdery modified PVA-based resin having a side-chain 1,2-diol structural unit (PVA-2) was obtained in the same manner as in Example 1, except that the cutter was adjusted to increase the particle size of the PVA-based resin.

Evaluation of PVA-2 was performed in the same manner as PVA-1. The results are shown in Table 1.

Example 3

A powdery modified PVA-based resin having a side-chain 1,2-diol structural unit (PVA-3) was obtained in the same manner as in Example 2, except that 100 parts of vinyl acetate, 23 parts of methanol, and 6 parts of 3,4-diacetoxy-1-butene were used.

Evaluation of PVA-3 was performed in the same manner as PVA-1. The results are shown in Table 1.

Comparative Example 1

A powdery modified resin having a side-chain 1,2-diol structural unit (PVA-4) was obtained in the same manner as in Example 1, except that 100 parts of vinyl acetate, 32.5 parts of methanol, and 2 parts of 3,4-diacetoxy-1-butene were used.

Evaluation of PVA-4 was performed in the same manner as PVA-1. The results are shown in Table 1.

TABLE 1

| | Type of PVA | Degree of saponification (mol %) | Average polymerization degree | Type of modification | Modification rate (mol %) | Average particle diameter (μm) | Dissolution rate (mass %) | After 30 minutes (5° C.) | After 24 hours (20° C.) |
|---|---|---|---|---|---|---|---|---|---|
| Example 1 | PVA-1 | 99.2 | 600 | 1,2-diol | 3.0 | 700 | Seawater | 53.3 | 5.9 |
| | | | | | | | water | 72.2 | 1.9 |
| Example 2 | PVA-2 | 99.6 | 600 | 1,2-diol | 3.0 | 910 | Seawater | 72.2 | 19.0 |
| | | | | | | | water | 53.1 | 4.0 |
| Example 3 | PVA-3 | 99.0 | 1200 | 1,2-diol | 3.0 | 1170 | Seawater | 75.7 | 25.5 |
| | | | | | | | water | 64.2 | 4.7 |
| Comparative Example 1 | PVA-4 | 99.3 | 450 | 1,2-diol | 1.0 | 750 | Seawater | 95.1 | 77.6 |
| | | | | | | | water | 88.6 | 65.1 |

As seen from the results in Table 1, in the diverting agent containing a powdery PVA-based resin, the diverting agents of the present invention in Examples 1 to 3 do not completely dissolve in water and seawater in an ultra-low temperature to low temperature range (5° C. to 30° C.) for a certain period of time (about 5 minutes to 3 hours), and are quickly dissolved and removed after a certain period of time.

Test Example 2

Example 4

Into a reaction can equipped with a reflux condenser, a dripping device, and a stirrer, 10 parts of vinyl acetate (10% of the total for initial charge), 38 parts of methanol and 0.6 part of 3,4-diacetoxy-1-butene (10% of the total for initial charge) were charged, the temperature was raised under a nitrogen stream while stirring to reach the boiling point, and then 0.08 part of acetyl peroxide was added to start polymerization.

After 0.5 hour from the start of polymerization, 90 parts of vinyl acetate and 5.4 parts of 3,4-diacetoxy-1-butene were dropped at a constant speed over 15 hours. When the polymerization rate of vinyl acetate was 96%, a predetermined amount of hydroquinone monomethyl ether was added to complete the polymerization, and then distillation was performed while blowing methanol vapor to remove unreacted vinyl acetate monomer out of the system to obtain a methanol solution of a copolymer.

Then, the above solution was diluted with methanol and adjusted to have a solid content concentration of 50%, and this methanol solution was charged into a kneader. The solution temperature was maintained at 35° C., and a methanol solution of 2% sodium hydroxide (in terms of sodium) was added in an amount of 6.8 mmol with respect to 1 mol (total amount) of vinyl acetate structural units and 3,4-diacetoxy-1-butene structural units in the copolymer, thereby performing saponification. As the saponification proceeded, a saponified product was precipitated, and when the saponified product was turned into particles, a methanol solution of 2% sodium hydroxide (in terms of sodium) was further added in an amount of 6 mmol with respect to 1 mol (total amount) of vinyl acetate structural units and 3,4-diacetoxy-1-butene structural units, thereby performing saponification. Thereafter, acetic acid for neutralization was added in an amount 0.8 equivalent per 1.0 equivalent of sodium hydroxide. The saponified product was filtered, well washed with methanol and dried in a hot air dryer to obtain a PVA-based resin having a side-chain 1,2-diol structure (PVA-5α).

The degree of saponification of PVA-5a was analyzed according to JIS K 6726:1994 by alkali consumption required for hydrolysis of the residual vinyl acetate and 3,4-diacetoxy-1-butene structural units in the resin, and was found to be 99.0 mol %. The average polymerization degree of PVA-5a was analyzed according to JIS K 6726:1994, and was found to be 300.

In PVA-5α, the content (modification rate) of the 1,2-diol structural unit represented by the above formula (1) was calculated based on an integrated value determined by $^1$H-NMR (300 MHz proton NMR, a DMSO-$d_6$ solution, internal standard substance: tetramethylsilane, 50° C.), and was found to be 3.0 mol %.

PVA-5a and PVA-1 were mixed in a ratio (mass ratio) of PVA-5α/PVA-1=42/58, the mixture was charged into an extruder. Further, 500 ppm of magnesium stearate and 500 ppm of magnesium 12-hydroxystearate were mixed thereto, melt-kneading was performed under the following conditions, and solidification was performed by air cooling. Then cutting was performed using a cutter (strand cutting method). Thereafter, drying was performed to obtain cylindrical PVA-based resin particles (PVA-5) having a diameter of 2.6 mm and an axial length of 3 mm.
(Melt-Kneading Conditions)
Extruder: 15 mm in diameter, L/D=60, manufactured by Technovel Corporation
Rotation speed: 200 rpm
Discharge rate: 1.2 to 1.5 kg/h
Extrusion temperature: C1/C2/C3/C4/C5/C6/C7/C8/D=90/170/200/215/215/220/225/225/225 (° C.)

Evaluation of PVA-5 was performed in the same manner as PVA-1, except that the average particle diameter was not calculated. The results are shown in Table 2.

Example 5

A modified PVA-based resin having a side-chain 1,2-diol structural unit was obtained in the same manner as in Example 1, except that 100 parts of vinyl acetate (40% of the total for initial charge), 27 parts of methanol, and 12 parts of 3,4-diacetoxy-1-butene (40% of the total for initial charge) were used, the polymerization was completed when the polymerization rate was 96%, and a methanol solution of 2% sodium hydroxide (in terms of sodium) was used in an amount of 6 mmol.

The PVA-based resin obtained above was molded under the same melt-kneading conditions as in Example 4 to obtain cylindrical PVA-based resin particles (PVA-6) having a diameter of 2.6 mm and an axial length of 3 mm.

Evaluation of PVA-6 was performed in the same manner as PVA-5. The results are shown in Table 2.

Example 6

A modified PVA-based resin having a side-chain 1,2-diol structural unit was obtained in the same manner as in Example 1, except that 100 parts of vinyl acetate (14% of the total for initial charge), 27 parts of methanol, and 16 parts of 3,4-diacetoxy-1-butene (14% of the total for initial charge) were used, the polymerization was completed when the polymerization rate was 93%, and a methanol solution of 2% sodium hydroxide (in terms of sodium) was used in an amount of 8 mmol.

The PVA-based resin obtained above was molded under the same melt-kneading conditions as in Example 4 to obtain cylindrical PVA-based resin particles (PVA-7) having a diameter of 2.6 mm and an axial length of 3 mm.

Evaluation of PVA-7 was performed in the same manner as PVA-5. The results are shown in Table 2.

Comparative Example 2

A modified PVA-based resin having a side-chain 1,2-diol structural unit was obtained in the same manner as in Example 1, except that 100 parts of vinyl acetate (20% of the total for initial charge), 32.5 parts of methanol, and 4 parts of 3,4-diacetoxy-1-butene (20% of the total for initial charge) were used, and the polymerization was completed when the polymerization rate was 91%.

The PVA-based resin obtained above was molded under the same melt-kneading conditions as in Example 4 to obtain cylindrical PVA-based resin particles (PVA-8) having a diameter of 2.6 mm and an axial length of 3 mm.

Evaluation of PVA-8 was performed in the same manner as PVA-5. The results are shown in Table 2.

TABLE 2

|  | Type of PVA | Degree of saponification (mol %) | Average polymerization degree | Type of modification | Modification rate (mol %) | Dissolution rate (mass %) | After 30 minutes (5° C.) | After 24 hours (20° C.) |
|---|---|---|---|---|---|---|---|---|
| Example 4 | PVA-5 | 99.0 | 450 | 1,2-diol | 3.0 | Seawater | 94.0 | 35.2 |
|  |  |  |  |  |  | water | 85.0 | 1.5 |
| Example 5 | PVA-6 | 99.0 | 450 | 1,2-diol | 6.0 | Seawater | 73.7 | 0.4 |
|  |  |  |  |  |  | water | 60.5 | 0.0 |

TABLE 2-continued

|  | Type of PVA | Degree of saponification (mol %) | Average polymerization degree | Type of modification | Modification rate (mol %) | | Dissolution rate (mass %) After 30 minutes (5° C.) | After 24 hours (20° C.) |
|---|---|---|---|---|---|---|---|---|
| Example 6 | PVA-7 | 99.0 | 300 | 1,2-diol | 8.0 | Seawater water | 68.5 53.1 | 0.4 0.0 |
| Comparative Example 2 | PVA-8 | 99.0 | 530 | 1,2-diol | 2.0 | Seawater water | 99.0 99.0 | 80.0 60.2 |

As seen from the results in Table 2, in the diverting agent containing a melt-molded PVA-based resin, the diverting agents of the present invention in Examples 4 to 6 do not completely dissolve in water and seawater in an ultra-low temperature to low temperature range (5° C. to 30° C.) for a certain period of time (about 5 minutes to 3 hours), and are quickly dissolved and removed after a certain period of time.

Although the present invention has been described in detail with reference to specific embodiments, it will be apparent to those skilled in the art that various modifications and variations are possible without departing from the spirit and scope of the present invention. The present application is based on a Japanese Patent Application (Japanese Patent Application No. 2019-23948) filed on Feb. 13, 2019, and the content thereof is incorporated herein as reference.

The invention claimed is:

1. A diverting agent comprising:
   a polyvinyl alcohol-based resin having 2.3 mol % to 15 mol % of a primary hydroxy group in the side chain thereof,
   wherein a content of the polyvinyl alcohol-based resin is 50 mass % to 100 mass % with respect to the entire diverting agent.

2. The diverting agent according to claim 1, wherein the polyvinyl alcohol-based resin has 2.3 mol % to 6 mol % of the primary hydroxy group and is in the form of a powder.

3. The diverting agent according to claim 2, wherein an average particle diameter of the polyvinyl alcohol-based resin is 100 μm to 2000 μm.

4. The diverting agent according to claim 1, wherein the polyvinyl alcohol-based resin has 2.5 mol % to 15 mol % of the primary hydroxy group and is the form of a melt molded body.

5. The diverting agent according to claim 1, wherein the diverting agent is in the form of an aqueous solution at 30° C. or lower.

6. A method of temporarily filling a fracture generated in a well, the method comprising:
   allowing the diverting agent according to claim 1 to flow into a fracture with a flow of a fluid in the well.

7. The method of claim 6, wherein the diverting agent is in the form of an aqueous solution at 30° C. or lower.

8. The diverting agent according to claim 1, wherein the content of the polyvinyl alcohol-based resin is 80 mass % to 100 mass % with respect to the entire diverting agent.

9. The diverting agent according to claim 1, wherein the content of the polyvinyl alcohol-based resin is 90 mass % to 100 mass % with respect to the entire diverting agent.

* * * * *